(12) United States Patent
Kolte et al.

(10) Patent No.: US 11,190,339 B2
(45) Date of Patent: Nov. 30, 2021

(54) SYSTEM AND METHOD FOR PERFORMING EQUALITY AND LESS THAN OPERATIONS ON ENCRYPTED DATA WITH QUASIGROUP OPERATIONS

(71) Applicant: BAFFLE INC., Santa Clara, CA (US)

(72) Inventors: Priyadarshan Kolte, Santa Clara, CA (US); Spence Jackson, Santa Clara, CA (US); Palanivel Rajan Shanmugavelayutham, Santa Clara, CA (US); Mihir Bellare, Santa Clara, CA (US); Nathan Chenette, Santa Clara, CA (US)

(73) Assignee: BAFFLE, INC., Santa Clara, CA (US)

( * ) Notice: Subject to any disclaimer, the term of this patent is extended or adjusted under 35 U.S.C. 154(b) by 122 days.

(21) Appl. No.: 16/412,174

(22) Filed: May 14, 2019

(65) Prior Publication Data
US 2020/0366462 A1  Nov. 19, 2020

(51) Int. Cl.
| H04L 29/06 | (2006.01) |
| H04L 9/06 | (2006.01) |
| H04L 9/08 | (2006.01) |
| H04L 9/32 | (2006.01) |

(52) U.S. Cl.
CPC ............ *H04L 9/0618* (2013.01); *H04L 9/085* (2013.01); *H04L 9/0819* (2013.01); *H04L 9/0869* (2013.01); *H04L 9/3242* (2013.01)

(58) Field of Classification Search
CPC ..... H04L 9/0618; H04L 9/0819; H04L 9/085; H04L 9/0869; H04L 9/3242
See application file for complete search history.

(56) References Cited

U.S. PATENT DOCUMENTS

| 7,280,663 | B1 | 10/2007 | Golomb et al. |
| 8,767,963 | B2 | 7/2014 | Huang |
| 8,811,608 | B2 | 8/2014 | Sella et al. |
| 9,521,124 | B2 | 12/2016 | Raykova et al. |
| 10,289,816 | B1 | 5/2019 | Malassenet et al. |
| 10,630,478 | B1 | 4/2020 | Yavuz |
| 2003/0191950 | A1 | 10/2003 | Patel et al. |
| 2009/0041236 | A1* | 2/2009 | Gligoroski ............. H04L 9/065 380/43 |
| 2011/0040820 | A1 | 2/2011 | Rane et al. |
| 2011/0211692 | A1 | 9/2011 | Raykova et al. |
| 2012/0159194 | A1* | 6/2012 | Anderson ............... G06F 21/14 713/190 |

(Continued)

FOREIGN PATENT DOCUMENTS

WO  WO2009115824 A1  9/2009

OTHER PUBLICATIONS

Patel, Sankita J., Ankit Chouhan, and Devesh C. Jinwala. "Comparative evaluation of elliptic curve cryptography based homomorphic encryption schemes for a novel secure multiparty computation." Journal of Information Security 2014 (2014). (Year: 2014).*

(Continued)

*Primary Examiner* — Shawnchoy Rahman
(74) *Attorney, Agent, or Firm* — DLA Piper LLP (US)

(57) ABSTRACT

An encryption system and method that addresses private computation in public clouds and provides the ability to perform operations of encrypted data (including equality determinations and compare for less than operations) are provided.

36 Claims, 4 Drawing Sheets

(56) References Cited

U.S. PATENT DOCUMENTS

| | | |
|---|---|---|
| 2016/0050070 A1 | 2/2016 | Bohli et al. |
| 2017/0163424 A1 | 6/2017 | Kafai et al. |
| 2018/0114028 A1 | 4/2018 | Kafai et al. |
| 2018/0349867 A1 | 12/2018 | Trieflinger |
| 2018/0357427 A1 | 12/2018 | Lindell et al. |
| 2019/0228469 A1 | 7/2019 | Yu et al. |
| 2019/0286837 A1 | 9/2019 | Yim et al. |
| 2019/0356468 A1 | 11/2019 | Zeh et al. |
| 2020/0034550 A1* | 1/2020 | Kim .................... G06F 21/6218 |
| 2020/0134204 A1 | 4/2020 | Furukawa et al. |
| 2020/0228325 A1* | 7/2020 | Fan |
| 2020/0228340 A1 | 7/2020 | Blackhurst et al. |
| 2020/0259651 A1 | 8/2020 | Mohassel et al. |
| 2020/0267144 A1 | 8/2020 | Wagner et al. |
| 2020/0351078 A1 | 11/2020 | Kolte et al. |
| 2021/0002811 A1 | 1/2021 | Bellinger et al. |
| 2021/0167946 A1* | 6/2021 | Bitan .................... H04L 9/0894 |

OTHER PUBLICATIONS

Intel SGX is at https://software.intel.com/en-us/sgx, printed Oct. 1, 2019.
Microsoft SEAL is at https://www.microsoft.com/en-us/research/project/microsoft-seal/, printed Oct. 1, 2019.
Cybernetica is at https://sharemind.cyber.ee/, printed Oct. 1, 2019.
Costan, Victor et al., entitled, "Intel SGX Explained," Computer Science and Artificial Intelligence Laboratory, Massachusetts Institute of Technology, 2016, 118 pp., https://eprint.iacr.org/2016/086.pdf.
Chen, Hao et al., entitled, "Simple Encrypted Arithmetic Library—SEAL v2.2," Microsoft Research, Royal Holloway, University of London, 33 pp., https://www.microsoft.com/en-us/research/wp-content/uploads/2017/06/sealmanual_v2.2.pdf, 2017.
Bogdanov, Dan et al., entitled, "Sharemind:aframeworkforfastprivacy-preserving computations," Univeristy Tartu, AS Cybernetica, 23 pp., https://eprint.iacr.org/2008/289.pdf, 2008.
Bellare, Mihir, entitled, "Encryption Translation: How to Inherit Standard Compliance," UCSD, Baffle, Inc. (Dec. 18, 2018), 27 pp.

\* cited by examiner

SYSTEM AND METHOD FOR PERFORMING EQUALITY AND LESS THAN OPERATIONS ON ENCRYPTED DATA WITH QUASIGROUP OPERATIONS

FIELD

The disclosure relates generally to cryptography and more particularly to cryptography used for computer data privacy.

BACKGROUND

When data is encrypted with the current NIST standard AES Counter Mode (CTR-XOR) symmetric key encryption scheme, the only operation that can be performed on the encrypted data is decryption. In particular, it is not possible to Add or Compare (for Less Than) two encrypted integers without first decrypting both ciphertexts. Thus, it is desirable to provide an encryption technique that provides data security, but permits the useful operations (including Equality detection and less than determinations) on the encrypted data.

The above problem is especially acute in the context of private computation in public clouds, but also exist in other areas. For compare for equality, known systems and methods use Deterministic Encryption (DE) or methods that compare hashes such as SHA. However, Deterministic Encryption (DE) is known to be less secure. Comparing large hashes is slow whereas comparing small hashes can give incorrect results due to collisions.

For the compare for less than operation, known systems use methods for Order Preserving Encryption (OPE) and Order Revealing Encryption (ORE), secure Multiparty Computation (SMPC) schemes such as Sharemind from Cybernetica or methods that use Garbled Circuits (GC). However, Order Preserving Encryption (OPE) and Order Revealing Encryption (ORE) used in isolation are known to be less secure. The SMPC protocols in the literature for Compare Less Than require many rounds of communication between the parties so are very slow. Garbled Circuits (GCs) have the potential to offer great privacy but are expensive to compute and require huge cipher texts to be communicated between the parties.

Thus, it is desirable to provide an encryption system and method that addresses the private computation in public clouds and provides the ability to perform operations (equality determination and compare for less than operation) on encrypted data and it is to this end that the disclosure is directed.

DETAILED DESCRIPTION OF ONE OR MORE EMBODIMENTS

The disclosure is particularly applicable to a system for outsourcing of a private computation to a public cloud such that the confidentiality of the data is maintained during operations on the data in the public cloud and it is in this context that the disclosure will be described. It will be appreciated, however, that the system and method has greater utility since it may be used for/with any system in which it is desirable to provide encryption for security while also allowing operations to be performed on the encrypted data. In the embodiments, the encryption and decryption processes include a message authentication code that prevents an attacker from forging encrypted values to launch an active attack. The system and method described below may be used to equality detection of encrypted data or a less than operation on encrypted data that uses quasigroup (abbreviated as QGroup) encryption and message authentication code (MAC) process to enable computations that can be performed without decryption in order to maintain confidentiality in a public cloud. The system and method also may leverage a SMPC system.

Figure 1:
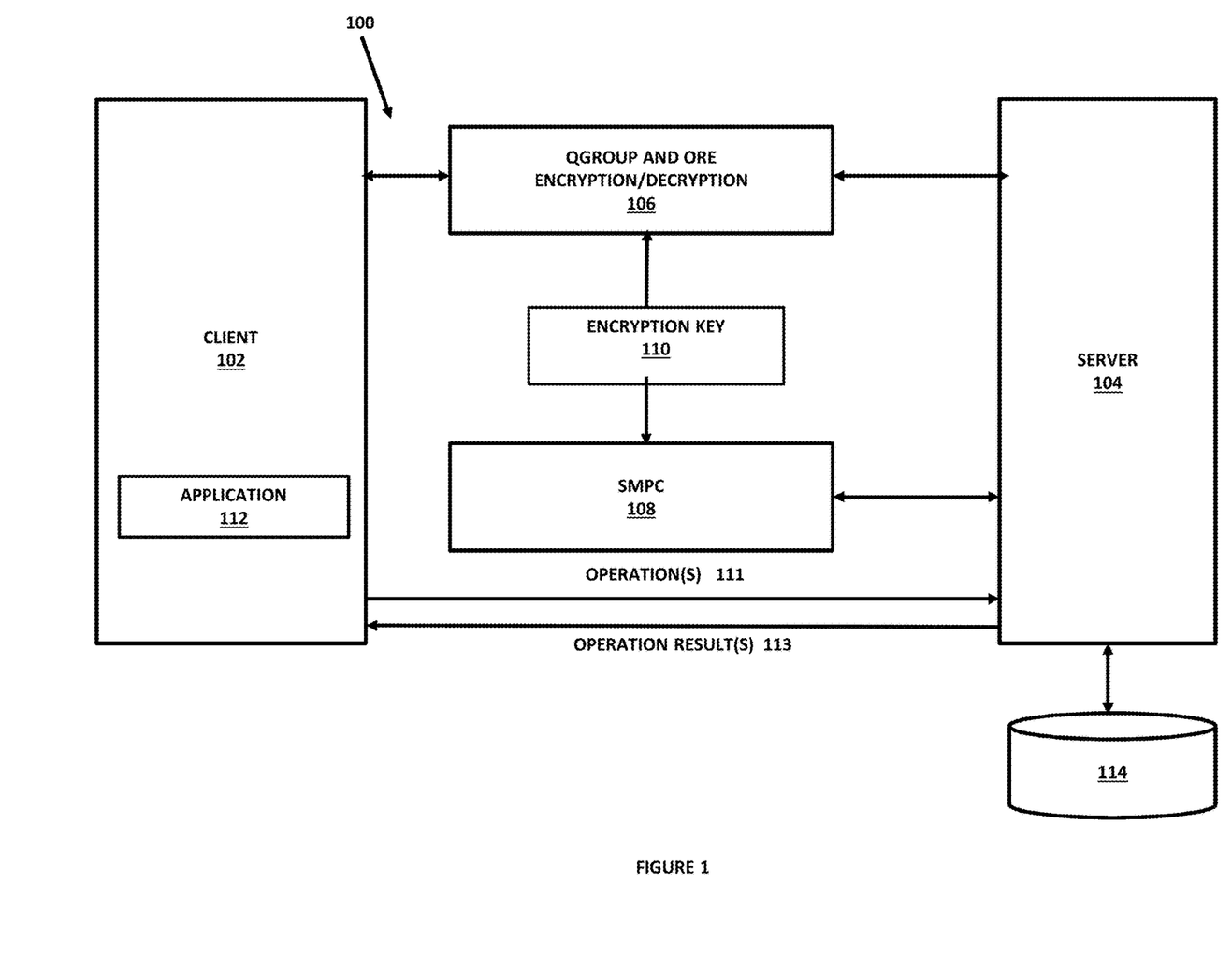
FIG. 1 illustrates an example embodiment of a system that can be used to perform various operations on encrypted data.

FIG. 1 illustrates an example embodiment of a system 100 that can be used to perform various operations on encrypted data. In the example embodiment, a client 102 and a server 104 are shown that communicate with each other, but the system may be implemented with a plurality of clients and a plurality of servers communicating each other. Each client 102 may be a computing device that has a processor, memory, I/O devices and a display and may be executing a plurality of lines of instructions/computer code (an application, a piece of code, a mobile application, etc.) that are requesting one or more operations, such as an equality detection operation or a compare for less than operation, to be performed on encrypted data. For example, the computing device for each client 102 may be a personal computer, a laptop computer, a tablet computer, a terminal and the like. In the below figures, the client may include an application 112 that is part of the client and issues the operation commands and receives the results from the server 104. Each server 104 may be a computer that has a processor, memory, I/O devices and a display and may be executing a plurality of lines of instructions/computer code (an application, a piece of code, a mobile application, etc.) that manage the client requested one or more operations and facilitate the operations on the encrypted data. For example, the computer for each server 104 may be a server computer, one or more cloud computing resources, one or more virtual computer resources, one or more blade servers, etc. The server 104 may have a database 114 attached that stores the encrypted data and on which the system performs the operations on the encrypted data. In one embodiment, the database 114 may be hosted/resident in a public cloud that necessitating storing the encrypted data and [performing the operations on the encrypted data. The database 114 may be implemented using a database server in one embodiment.

The system 100 may further comprise a QGroup and Order Revealing Encryption (ORE) encryption/decryption portion 106 that is connected between each client and each server and manages the encryption and decryption operations as described below. The encryption/decryption portion 106 may be implemented as one or more computer systems that have at least one processor, memory, I/O devices and may be executing a plurality of lines of instructions/computer code (one or more applications, pieces of code, mobile applications, etc.) that perform the encryption and decryption operations between each client 102 and the server 104 as described below.

The system may further comprise a known secure multiparty computation (SMPC) cluster 108 connected to the server 104 that assists in the performance of the requested operations on the encrypted data as described below in more detail. The SMPC cluster 108 may be implemented as one or more computer systems that have at least one processor, memory, I/O devices and may be executing a plurality of lines of instructions/computer code (one or more applications, pieces of code, mobile applications, etc.) that assists in the performance of the requested operations on the encrypted data as described below in more detail. The encryption/decryption portion 106 and the SMPC cluster 108 each may be implemented on the same or different computers as each other. In more detail, the encryption portion 106 may be implemented on the same system as the client 102 or on a separate system, but it is never implemented on the same system as the server 104 because that would make the encryption keys available on the server 104. Furthermore, each of the encryption/decryption portion 106 and the SMPC cluster 108 may be implemented on the same or different computers than the server 104. As shown in FIG. 1, an encryption key 110 may be provided at times to each of the encryption/decryption portion 106 and the SMPC cluster 108 to perform the encryption/decryption and the operations on the encrypted data. Each client may generate one or more operation(s) 111 on encrypted data and the server 104 will return results 113 for those operation(s) to the client as described below.

Figure 2:
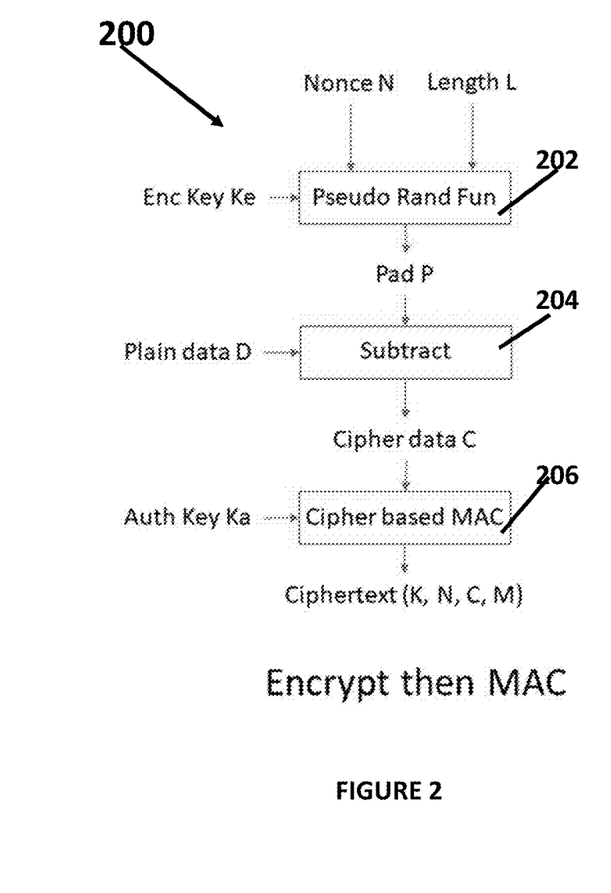
FIG. 2 illustrates an encryption method (including encryption and message authentication code) that can be performed using the system in FIG. 1.
Figure 3:
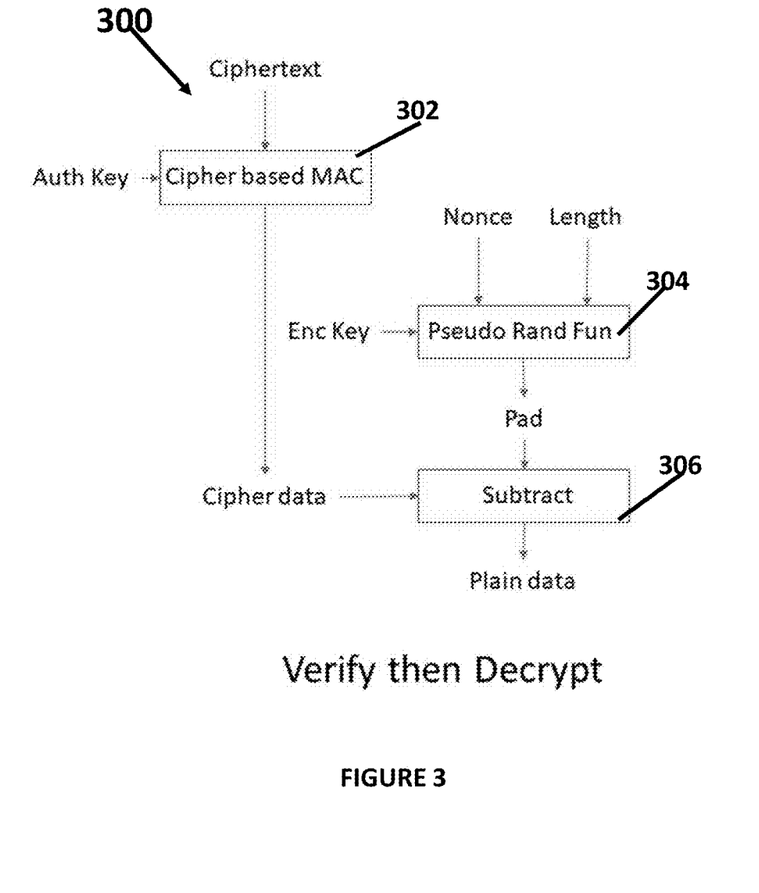
FIG. 3 illustrates a decryption method that can be performed using the system in FIG. 1.

FIG. 2 illustrates an encryption method 200, FIG. 3 illustrates a verify and decrypt operation method 300 that may be performed by the system shown in FIG. 1. Each of these processes may use one or more of the system elements 100-114 shown in FIG. 1 to perform the processes.

Returning to the encryption operation 200, the encryption (that may be in one embodiment performed by the encryption element 106 in FIG. 1) uses two secret keys (previously generated using an encryption scheme or generated at the time of the encryption) to perform the encryption. One secret key is an encryption key, Ke, and the other secret key is an authentication key, Ka wherein the encryption key Ke is used to encrypt the plain data D from the client/application 102, 112 and the authentication key Ka is used to perform the message authentication code (MAC) process on the cipher data C generated by the encryption using secret key Ke. In one embodiment, the encryption/decryption processes may be performed using the known QGroups encryption process.

As shown in FIG. 2, the encryption method 200 may use a Pseudo Random Function (Prf) (process 202), which is a cryptographic function such as AES encryption or HMAC-SHA message digest, to generate a pseudo-random pad P that is then combined with the plain data D from the client/application 102, 112 using a QGroup subtract operation 204. In more detail, process 202 takes a Nonce N which is a random number that is used just once, a length L which is the number of bits of the plain text data, and the encryption secret key Ke that is used by the Prf to generate the pad P. The NIST standard AES Counter Mode (CTR-XOR) uses the AES encryption function as the Prf and the Xor function as the QGroup operation. The NIST standard describes how CTR-XOR encryption takes plain data M of length L bits, a nonce N, and a secret key K to first generate a set of m=ceiling(L/128) input blocks of 128 bits each derived from N, N+1, . . . , N+m−1, then encrypts each input block using AES encryption with key Ke to generate m output blocks, and finally concatenates all m output blocks to generate the pseudo-random pad P of length L bits. In the second step of encryption (process 204), the pseudo-random pad P is XORed with the plain data D to produce cipher data C.

The QGroup G consists of the set G.S that contains all binary strings of length L along with three operations: G.Add, G.Lsub, and G.Rsub. The G.Add operation takes any two elements A and B from set G.S and produces another element C in set G.S. The G.Lsub operation takes any two elements A and C from set G.S and produces a unique element B from the set such that G.Add(A, B)=C. The G.Rsub operation takes any two elements B and C from set G.S and produces a unique element A in the set such that G.Add(A, B)=C. The G.Lsub operation is known as the left-inverse and the G.Rsub operation is known as the right-inverse for the G.Add operation.

In one embodiment, the QGroup G may be chosen so that G.Add(P, D)=(P−D) mod $2^L$ and G.Lsub(P, C)=(P−C) mod $2^L$. This choice would make Subtract operation 204 be G.Add(P, D) which makes C=(P−D) mod $2^L$ and the Subtract operation 306 be G.Lsub(P, C) which make D=(P−C) mod $2^L$. Other choices of the QGroup operations are also possible.

As part of the encryption process, the cipher data C may be fed into a message authentication code (MAC) process 206. The MAC process 206 also receives the authentication key Ka and produces ciphertext may then be stored in the database 114 along with the nonce N and the MAC (M) as the ciphertext (K, N, C, M). The MAC process 206 is used after the subtract process 204 in order to prevent an attacker from forging encrypted values to launch an active attack. In one embodiment shown in FIGS. 2-3, a known Cipher-based MAC (CMAC) may be used, but any keyed cryptographic hash function may be used in this system and method.

During the decryption method 300, the ciphertext may be fed into the cipher based MAC process 302 with the authentication key Ka as input to generate the cipher data that may be input to a subtract decryption process 306. Thus, the MAC result (the hash) is recomputed using the authentication key Ka and verified during decryption so that the actual decryption using the encryption key Ke proceeds only if the MAC verification confirms that the cipher text has not been tampered with after encryption. During the decryption, the nonce N and the length L (stored along with the ciphertext) and the encryption key Ke may be input to a pseudo random function 304 that again generates the pad P that is fed into the subtract decryption process 306. The subtract decryption process 306 may use the cipher data and the pad to perform the subtraction operation and generate the plain data that may be then be returned to the client/application 102, 112.

The above encryption and decryption methods 200, 300 may be used to perform several different operations on encrypted data. More specifically, an exemplary encrypted equality operation (shown in FIGS. 4-5) and an exemplary encrypted less than operation (shown in FIGS. 6-7) may be performed. Note that these operations on encrypted data would not be possible using the conventional systems and processes and thus the system and method provide a technical solution to the technical problem of being able to perform operations on encrypted data.

Encrypted Equality Operation

Figure 4:
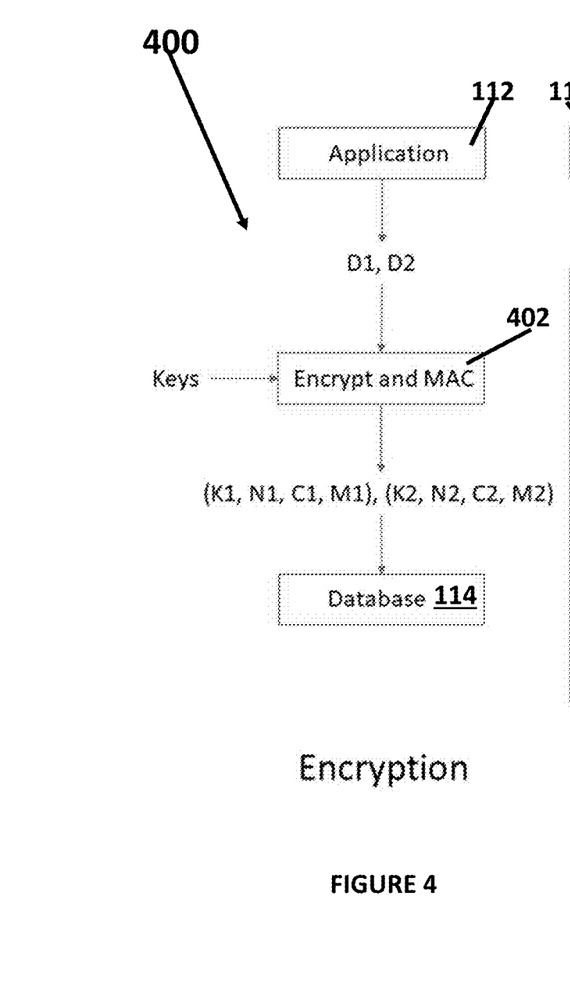
FIG. 4 illustrates an example of the encryption method for an encrypted equality operation.
Figure 5:
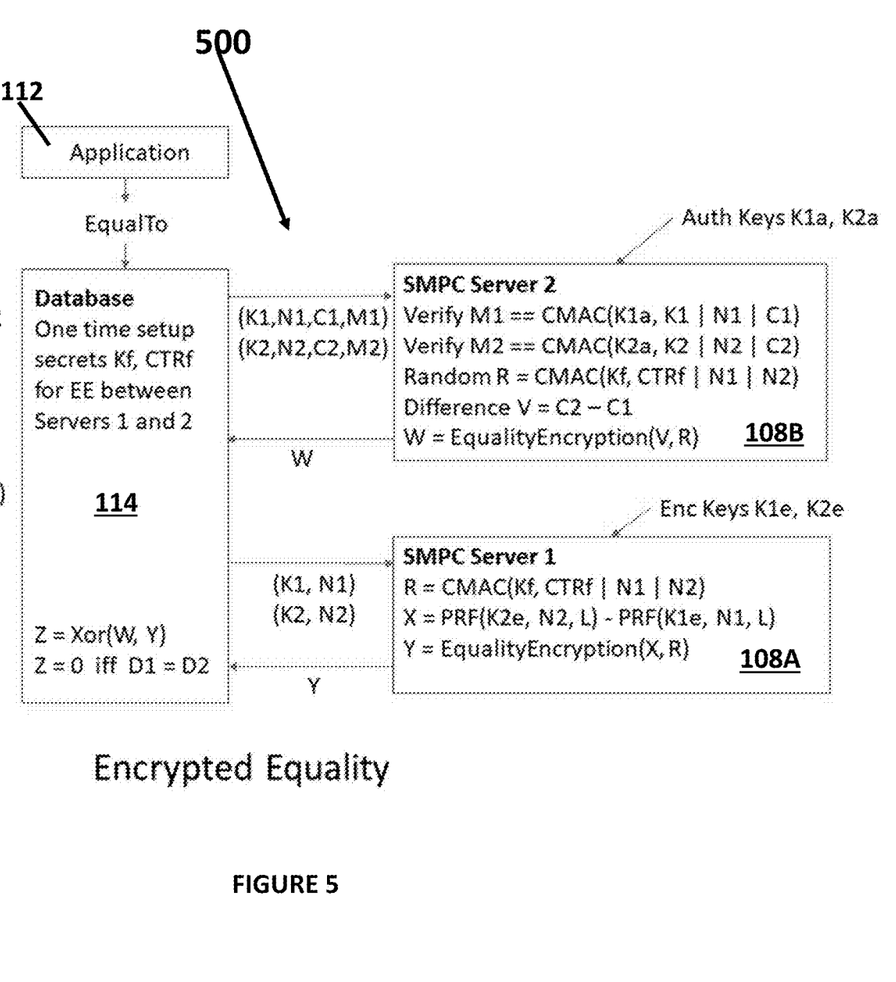
FIG. 5 illustrates more details of the encrypted equality operation.

FIG. 4 illustrates an example of the encryption method 400 for an encrypted equality operation 500 and FIG. 5 illustrates more details of the encrypted equality operation

500. The encrypted equality operation 500 may use the known SMPC protocol with two SMPC computers (SMPC server 1 108A and SMPC server 2 108B, for example as shown in FIG. 5). The first SMPC computer 108A has access to the encryption keys (K1e, K2e for each of the items of data (D1, D2) used in the equality operation) whereas the second computer 108B has access to the authentication keys (K1a, K2a for each of the items of data (D1, D2) used in the equality operation). The encryption keys are used for computing a difference of the first shares on the first computer 108A whereas the authentication keys are used for verifying the integrity of the cipherdata before computing a difference of the second shares on the second computer 108B which are both described in more detail below. The database 114 does not have access to any keys.

Both the first and second computers 108A, 108B share a secret key, Kf, and a counter value, CTRf, that are set up once using a key exchange protocol, such as Diffie Hellman, to establish the shared secret that is not exposed to the database 114. CTRf is a counter that is incremented after every equality encryption operation and Kf is the key that is used to encrypt Ctrf to generate a set of random numbers to be used for equality encryption.

The equality encryption function leverages three advantages to encrypt efficiently. First, there is no need for a decryption function as described below. Second, there is a synchronized stream of random numbers between the two SMPC computers 108A, 108B as described below. Third, each random number is used just once for a pair of operands thus increasing the security of the operation as described below.

The encryption and encrypted equality methods 400, 500 may include the following processes as shown in FIGS. 4-5:
  a. The Application 112 performs these processes:
    i. Encrypt plain data D1 with nonce N1 using encryption key K1e followed by a MAC using the authentication key K1a to produce cipher text (K1, N1, C1, M1) (process 402) for storage on the Database 114,
    ii. encrypt plain data D2 with nonce N2 using encryption key K2e and authentication key K2a to produce cipher text (K2, N2, C2, M2) (process 402) for storage on the Database 114, and
    iii. initiate an Equality operation (EqualTo operation as shown in FIG. 5) of the two cipher texts on the Database 114.
  b. The Database 114 (and the computer or database server that hosts the database 114) performs two processes in parallel:
    i. Send ciphertexts (K1, N1, C1, M1) and (K2, N2, C2, M2) to the second computer 108B and wait for response, W, from the second computer 108B to be returned to the database 114, and
    ii. Send first shares (K1, N1) and (K2, N2) of each ciphertext to the first computer 108A and wait for response, Y, from the first computer 108A to be returned to the database 114.
  b. The second computer 108B performs these processes:
    i. Receive cipher texts (K1, N1, C1, M1) and (K2, N2, C2, M2) from Database 114,
    ii. recompute M1 and M2 as the MACs of the received ciphertexts. If verification succeeds, use the correct values of N1 and N2 in subsequent processes and if verification fails, use random values, R, for N1 and N2 instead;
    iii. encrypt CTRf followed by N1 and N2 using key Kf to produce random values R.
    iv. compute $V=(C2-C1) \mod 2^L$,
    v. compute W=EqualityEncryption(V, R) as follows:
      i. extract non-zero random value A from R
      ii. extract a different random value B from R
      iii. treat A, B, and V as elements of a finite field D to use field multiplication and addition to compute $W=A*V+B$, and
    vi. send W to Database 114.
  c. The first SMPC computer 108A performs these processes:
    i. Receive (K1, N1) and (K2, N2) from Database 114,
    ii. encrypt CTRf followed by N1 and N2 using key Kf to produce random values R,
    iii. compute $X=(Prf(K2e, N2, L)-Prf(K1e, N1, L)) \mod 2^L$,
    iv. compute Y=EqualityEncryption(X, R) as follows:
      a. extract non-zero random value A from R
      b. extract a different random value B from R
      c. treat A, B, and X as elements of a finite field D to use field multiplication and addition to compute $Y=A*X+B$, and
    v. send Y to Database 114.
  d. The Database 114 performs these processes:
    i. Receive W from the second computer 108B,
    ii. receive Y from the first computer 108A,
    iii. compute Z=Xor (W,Y),
    iv. Use Z=0 as the result of D1=D2.

Encrypted Less than Operation

Figures 6, 7:
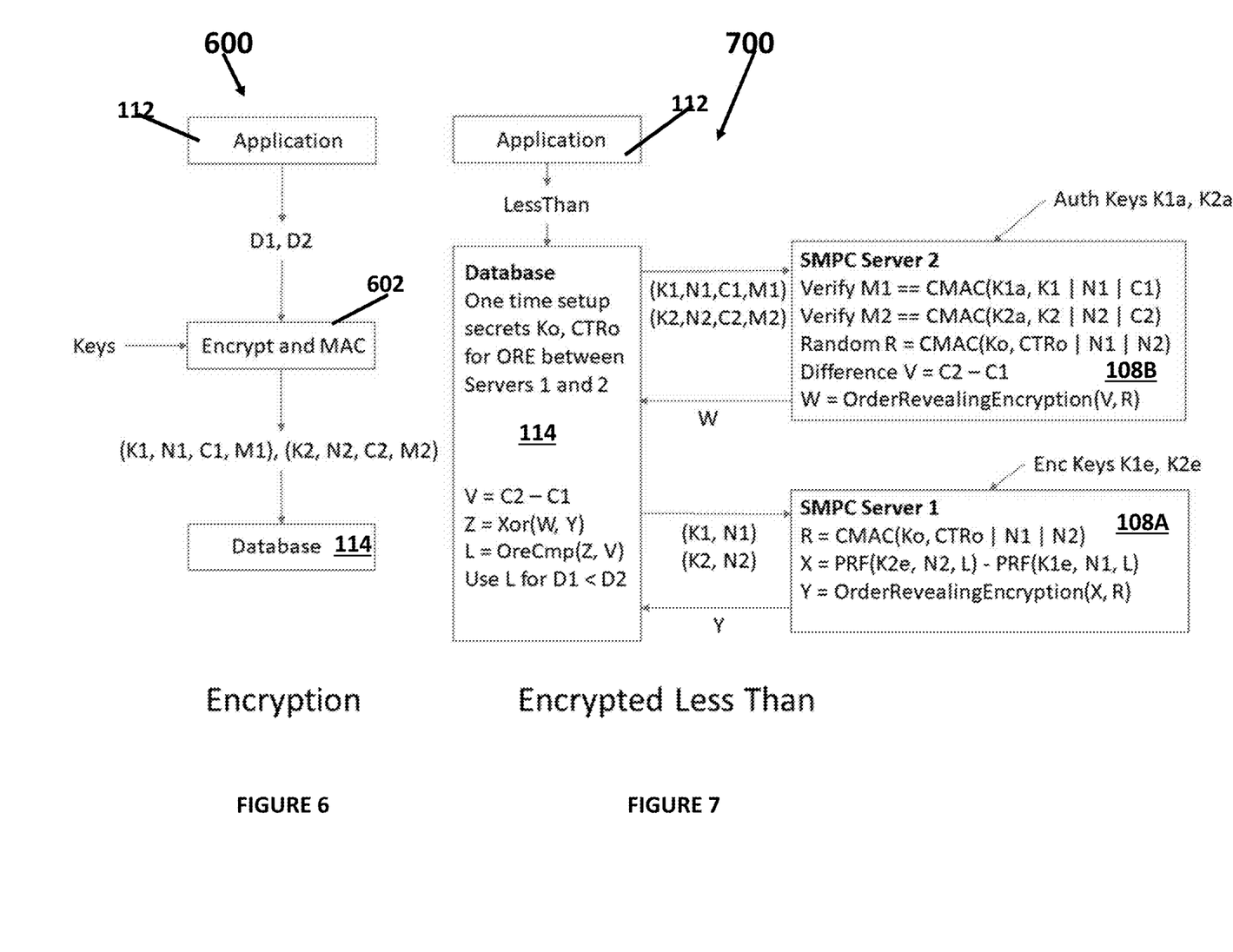
FIG. 6 illustrates an example of the encryption method for an encrypted less than operation.
FIG. 7 illustrates more details of the encrypted less than operation.

FIG. 6 illustrates an example of the encryption method 600 for an encrypted less than operation 700 that may be performed, in one embodiment, using the system shown in FIG. 1, but may also be implemented using other systems. Using this operation, cipher texts for L−1 bit integers D1 and D2 produced by the QGroup encryption schemes may be compared for LessThan by the following SMPC protocol. This protocol relies on an Order Revealing Encryption (ORE) scheme such as "Practical Order-Revealing Encryption with Limited Leakage" taught by Nathan Chenette et al in 2016. The method incorporates the ORE scheme to use first and second computers 108A, 108B in an SMPC cluster as shown in FIG. 7. The first computer 108A has access to the encryption keys (K1e, K2e for each of the items of data D1, D2) whereas the second server has access to the authentication keys (K1a, K2a for each of the items of data D1, D2). The encryption keys are used for computing a difference of the first shares on the first computer 108A whereas the authentication keys are used for verifying the integrity of the cipherdata before computing a difference of the second shares on the second computer 108B. The database 114 does not have access to any keys as for the equality operation.

Both of the computers 108A, 108B also share a secret key, Ko, and a counter value, CTRo, that are set up once using a key exchange protocol, such as Diffie Hellman, to establish the shared secret that is not exposed to the database 114. CTRo is a counter that is incremented after every ORE operation and Ko is the key that is used to encrypt Ctro to generate a set of random numbers to be used for ORE.

The ORE function leverages four advantages to encrypt efficiently. First, the operation does not require a decryption function to return a result on the encrypted data. Second, there is a synchronized stream of random numbers between the two computers 108A, 108B. Third, each random number is used just once for a pair of operands. Fourth, the plain differences of the second shares can be recomputed at the database 114.

The less than operation and the encryption 600, 700 may include the following processes:

a. The Application 112 performs these processes:
   i. Encrypt plain data D1 with nonce N1 using encryption key K1e followed by a MAC using the authentication key K1a to produce cipher text (K1, N1, C1, M1) (process 602) for storage on the Database 114,
   ii. encrypt plain data D2 with nonce N2 using encryption key K2e and authentication key K2a to produce cipher text (K2, N2, C2, M2) (process 602) for storage on the Database 114, and
   iii. initiate a LessThan operation of the two cipher texts on the Database 114.

b. The Database 114 (and/or the computer hosting the database or a database server) performs 2 processes in parallel:
   i. Send ciphertexts (K1, N1, C1, M1) and (K2, N2, C2, M2) to second computer 108B and wait for response W from the second computer 108B, and
   ii. send first shares (K1, N1) and (K2, N2) to Server 1 and wait for response Y from the first computer 108A c. The second computer 108B performs these processes:
   i. Receive cipher texts (K1, N1, C1, M1) and (K2, N2, C2, M2) from Database 114.
   ii. Recompute M1 and M2 as the MACs of the received ciphertexts. If verification succeeds, use the correct values of N1 and N2 in subsequent steps. If verification fails, use random values for N1 and N2 instead.
   iii. encrypt Ctro followed by N1 and N2 using key Ko to produce random values R.
   iv. compute $V=(C2-C1) \bmod 2^L$,
   v. compute W=OrderRevealingEncryption(V, R) as follows:
      i. compute the encrypted sign bit by XOR with a random pad as $W[0]=R[0] \oplus V[0]$
      ii. compute the encrypted most significant bit of magnitude by XOR with a different random pad as $W[1]=R[1] \oplus V[1]$
      iii. encrypt each subsequent bit of the magnitude by XOR with a new random pad that is an encryption (such as Equality Encryption) of the preceding prefix (excluding the sign bit V[0]) as $W[i]=V[i] \oplus \text{EqualityEncryption}(V[1]\|V[2]\| \ldots \|V[i-1],R) \bmod 2$ vi. send W to Database 114.

d. The SMPC first computer 108A performs these processes:
   i. Receive (K1, N1) and (K2, N2) from Database 114
   ii. encrypt Ctro followed by N1 and N2 using key Ko to produce random values R,
   iii. compute $X=(\text{Prf}(K2e, N2, L)-\text{Prf}(K1e, N1, L)) \bmod 2^L$,
   iv. compute Y=OrderRevealingEncryption(X, R) as follows:
      a. compute the encrypted sign bit by XOR with a random pad as $Y[0]=R[0] \oplus X[0]$ b. compute the encrypted most significant bit of magnitude by XOR with a different random pad as $Y[1]=R[1] \oplus X[1]$
      c. encrypt each subsequent bit of the magnitude by XOR with a new random pad that is an encryption (such as Equality Encryption) of the preceding prefix (excluding the sign bit X[0]) as $Y[i]=X[i] \oplus \text{EqualityEncryption}(X[1]\|X[2]\| \ldots \|X[i-1],R) \bmod 2$ v. send Y to Database 114.

e. The Database 114 performs these processes:
   i. Receive W from the second computer 108B,
   ii. receive Y from the first computer 108A,
   iii. compute Z=Xor(W, Y),
   iv. if Z=0 then the values D1 and D2 are equal, otherwise proceed with the next steps
   v. compute $V=(C2-C1) \bmod 2^L$,
   vi. compute L=OreCompare(Z, V) as follows:
      i. if the bits of Z are numbered so that 0 is the most significant bit and 1 is the next most significant bit, then bit Z[0] is the difference of the sign bits C1[0] and C2[0],
      ii. let i be the least index (of most significant bit) after 0 such that Z[i] is not zero,
      iii. compare bit V[i] to bit Z[0]; if V[i]=Z[0], set indication L=1, otherwise set L=0, and
   vii. use L as the result of D1<D2.

When comparing encrypted strings of characters, it is necessary to individually encrypt each character so that two encrypted strings can be compared for LessThan. The compare method for strings S and T starts with comparing the first characters S[0] and T[0] and then compares subsequent characters until either one of the strings runs out of characters or the comparison finds some character S[i] that is not equal to T[i]. If one of the strings, say S, runs out of characters then all characters of string S are equal to the prefix of the other string T, so the method declares that S<T. If the method finds an index i with unequal characters, it checks whether S[i]<T[i] to determine whether string S<string T.

Although all characters in the two strings at indices from 0 to i−1 are determined to be equal and the order of the characters at index i is revealed, the privacy of the subsequent characters in the strings (from index i+1 to the end of the string) is retained using the following method. The EqualityEncryption as well as the OrderRevealingEncryption functions both use a synchronized stream of random numbers on the two SMPC servers. It is important for the two streams to be identical for encrypting all characters from indices 0 to i so that characters on both servers are identically encrypted, but it is not necessary for the streams to be similar for characters after index i.

Let $R_j$ be the set of n random bits used for encrypting character S[j] and let $P_j$ be the set of n random bits used for encrypting character T[j]. Then the following method makes $R_j$ dependent on the prefix S[0]S[1] ... S[j−1] and $P_j$ dependent on the prefix T[0]T[1] ... T[j−1].

$R_0=\text{CMAC}(Ko,Ctro\|N1\|N2)$ $R_j=S[j-1] \oplus \text{PRF}(Ko,R_{j-1},n)$ $P_0=\text{CMAC}(Ko,Ctro\|N1\|N2)$ $P_j=T[j-1] \oplus \text{PRF}(Ko,P_{j-1},n)$ This method of generating the random bits ensures that the first set of random bits $R_0=P_0$ because of the common Ko and Ctro. As long as the prefix S[0] ... S[i−1]=T[0] ... T[i−1] we have $R_i=P_i$. However, after the first differing character at index i where S[i]≠T[i] we get R[i+j]≠P[i+j] for all subsequent characters with j>0. The difference in random bits results in all subsequent characters getting encrypted randomly which preserves their privacy.

Results

The SMPC Equality and LessThan protocol disclosed is much faster than previously published protocols such as in the Sharemind system because it reduces multiple rounds of communication between the Server and the SMPC Cluster Computers to a single round. Furthermore, the MAC process prevents an attacker from forging encrypted literal values. The above described system and method provides encryption for commercial databases such as Cassandra, MySQL, MariaDB, Postgres, MongoDB, Oracle, and Microsoft SQL Server that are deployed in public clouds such as Amazon Web Services and Microsoft Azure.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The invention may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
    encrypting, using QGroup encryption, a first item of plain data and a second item of plain data from a client to generate a first item of cipherdata and a second item of cipherdata;
    generating a message authentication code for each item of cipherdata to generate a first ciphertext and a second ciphertext;
    receiving, from the client, an operation request on the first and second ciphertexts to perform an operation on the first and second ciphertexts;
    performing, using a first and second computer of a secure multi-party computation (SMPC) cluster, the operation on the first and second ciphertext to generate an operation result without decryption of the first and second ciphertexts; and
    returning the operation result to the client.

2. The method of claim 1, wherein the operation on the first and second ciphertexts further comprises one of an encrypted equality operation and an encrypted less than operation.

3. The method of claim 1, wherein encrypting the first and second items of plain data further comprises generating the cipherdata for each of the first item of plain data and the second item of plain data using an encryption key, a QGroup subtract operation with a pseudorandom pad and the respective item of plain data.

4. The method of claim 3, wherein encrypting the first and second items of plain data further comprises generating, for each item of plain data, the pseudorandom pad using the encryption key, a pseudorandom function, a nonce and a length of each item of plain data.

5. The method of claim 4, wherein the pseudorandom function is one of an encryption method and a cryptographic message digest.

6. The method of claim 3, wherein generating the message authentication code for each item of cipherdata further comprises generating the message authentication code for each item of cipherdata using an authentication key.

7. The method of claim 6, wherein performing the operation on the first and second ciphertexts to generate the operation result further comprises providing the encryption key for each of the first and second item of plain data to the first computer of the SMPC cluster and providing the authentication key for each of the first and second item of plain data to the second computer of the SMPC cluster.

8. The method of claim 7, wherein performing the operation on the first and second ciphertexts to generate the operation result further comprises computing, on the first computer of the SMPC cluster, a difference between a first share of the first ciphertext and a first share of the second ciphertext, verifying, on the second computer of the SMPC cluster, an integrity of the first and second ciphertexts and computing, on the second computer of the SMPC cluster, a difference between a second share of the first ciphertext and a second share of the second ciphertext.

9. The method of claim 8, wherein performing the operation on the first and second ciphertexts to generate the operation result further comprises sharing a secret key and a counter value among the first computer and second computer of the SMPC cluster.

10. The method of claim 1, wherein encrypting the first and second items of plain data further comprises generating the cipherdata for each of the first item of plain data and the second item of plain data using an encryption key, a QGroup subtract operation with a pseudorandom pad and the item of plain data and wherein generating the message authentication code for each item of cipherdata further comprises generating the message authentication code for each item of cipherdata using an authentication key and further comprising sharing a secret key and a counter value among the first computer and second computer of the SMPC cluster.

11. The method of claim 10, wherein performing the operation on the encrypted data further comprises performing an encrypted equality operation on the first and second ciphertexts.

12. The method of claim 11, wherein performing the encrypted equality operation on the first and second ciphertexts further comprises recomputing, on the second computer of the SMPC cluster, the message authentication code for the first and second ciphertexts, generating, on the second computer of the SMPC cluster, a random value based on the secret key and the counter value, generating, on the second computer of the SMPC cluster, a difference between the first ciphertext and the second ciphertext and computing, on the second computer of the SMPC cluster, an equality encryption value based on the generated difference between the first ciphertext and the second ciphertext and the random value.

13. The method of claim 12, wherein performing the encrypted equality operation on the first and second ciphertexts further comprises generating, by the first computer of the SMPC cluster, a random value based on the secret key and the counter value, computing, by the first computer of the SMPC cluster, a difference between a pseudorandom function of a first share of the first ciphertext using the encryption key for the first ciphertext and a pseudorandom function of a first share of the second ciphertext using the encryption key for the second ciphertext and computing, on the first computer of the SMPC cluster, an equality encryption value based on the generated difference between the first and second ciphertexts and the random value.

14. The method of claim 13, wherein generating the operation result further comprises generating, at a database computer, an exclusive OR of the equality encryption value of the first computer of the SMPC cluster and the equality encryption value of the second computer of the SMPC cluster to determine if the first item of plain data and second item of plain data are equal.

15. The method of claim 10, wherein performing the operation on the encrypted data further comprises performing, using the SMPC cluster, an encrypted less than operation on the first and second pieces of cipherdata.

16. The method of claim 15, wherein performing the encrypted less than operation on the first and second items of cipherdata further comprises recomputing, on the second computer of the SMPC cluster, the message authentication code for the first and second ciphertexts, generating, on the second computer of the SMPC cluster, a random value based on the secret key and the counter value, generating, on the second computer of the SMPC cluster, a difference between the first and second ciphertexts and computing, on the second computer of the SMPC cluster, an order revealing encryption value based on the generated difference between the first and second ciphertexts and the random value.

17. The method of claim 16, wherein performing the encrypted less than operation on the first and second items of cipherdata further comprises generating, by the first computer of the SMPC cluster, a random value based on the secret key and the counter value, computing, by the first computer of the SMPC cluster, a difference between a pseudorandom function of a first share of the first ciphertext using the encryption key for the first ciphertext and a pseudorandom function of a first share of the second ciphertext using the encryption key for the second ciphertext and computing, on the first computer of the SMPC cluster, an order revealing encryption value based on the generated difference between the first and second ciphertexts and the random value.

18. The method of claim 17, wherein generating the operation result further comprises generating, at a database computer, a difference value between the first ciphertext and the second ciphertext, generating, at the database computer, an exclusive OR value of the order revealing encryption value from the first computer and the order revealing encryption value from the second computer, generating, by the database computer, a comparison value between the exclusive OR value and the difference value wherein the comparison value indicates if the first item of plain data is less than the second item of plain data.

19. A system, comprising:
a server computer having a processor;
a client capable of connecting to the server computer and issuing an operation on encrypted data to the server computer;
an encryption engine implemented on a computer system having a processor, connected between the client and the server computer, that is configured to encrypt a first item of plain data and a second item of plain data from the client to generate a first item of cipherdata and a second item of cipherdata that are received by the server computer and generate a message authentication code for each item of cipherdata to generate a first ciphertext and a second ciphertext;
a secure multi-party computation (SMPC) cluster having a first computer and a second computer connected to the server computer that receives the first and second items of cipherdata and generates an operating result in response to the operation on encrypted data without decryption of the first and second ciphertexts; and
the server computer returning the operating result to the client.

20. The system of claim 19, wherein the operation on the encrypted data further comprises one of an encrypted equality operation and an encrypted less than operation.

21. The system of claim 19, wherein the encryption engine is further configured to generate the cipherdata for each of the first item of plain data and the second item of plain data using an encryption key, a QGroup subtract operation with a pseudorandom pad and the respective item of plain data.

22. The system of claim 21, wherein the encryption engine is further configured to generate, for each item of plain data, the pseudorandom pad using the encryption key, a pseudorandom function, a nonce and a length of each item of the plain data.

23. The system of claim 22, wherein the pseudorandom function is one of an encryption method and a cryptographic message digest.

24. The system of claim 21, wherein the encryption engine is further configured to generate the message authentication code for each item of cipherdata using an authentication key.

25. The system of claim 24, wherein the first computer of the SMPC cluster receives the encryption key for each of the first and second item of plain data and wherein the second computer of the SMPC cluster receives the authentication key for each of the first and second item of plain data.

26. The system of claim 25, wherein the first computer of the SMPC cluster is further configured to compute a difference between a first share of the first ciphertext and a first share of the second ciphertext and wherein the second computer of the SMPC is further configured to verify an integrity of the first and second ciphertexts and compute a difference between a second share of the first ciphertext and a second share of the second ciphertext.

27. The system of claim 26, wherein the first and second computer of the SMPC cluster each share a secret key and a counter value.

28. The system of claim 19, wherein the encryption engine is further configured to generate the cipherdata for each of the first item of data and the second item of data using an encryption key, a QGroup subtract operation with a pseudorandom pad and the item of plain data and generate the message authentication code for each item of cipherdata using an authentication key and wherein a secret key and a counter value are shared among the first computer and second computer of the SMPC cluster.

29. The system of claim 28, wherein the first and second computers of the SMPC cluster perform an encrypted equality operation on the first and second items of cipherdata.

30. The system of claim 29, wherein the second computer of the SMPC cluster is further configured to recompute the message authentication code for the first and second ciphertexts, generate a random value based on the secret key and the counter value, generate a difference between the first and second ciphertexts and compute an equality encryption value based on the generated difference between the first and second ciphertexts and the random value.

31. The system of claim 30, wherein the first computer of the SMPC cluster is further configured to generate a random value based on the secret key and the counter value, compute a difference between a pseudorandom function of a first share of the first ciphertext using the encryption key for the first ciphertext and a pseudorandom function of a first share of the second ciphertext using the encryption key for the second ciphertext and compute an equality encryption value based on the generated difference between the first and second ciphertexts and the random value.

32. The system of claim 31, wherein the server is further configured to generate an exclusive OR of the equality encryption value of the first computer of the SMPC cluster and the equality encryption value of the second computer of the SMPC cluster to determine if the first item of plain data and second item of plain data are equal.

33. The system of claim 28, wherein the first and second computers of the SMPC cluster perform an encrypted less than operation on the first and second pieces of cipherdata.

34. The system of claim 33, wherein the second computer of the SMPC cluster is further configured to recompute the message authentication code for the first and second ciphertexts, generate a random value based on the secret key and the counter value, generate a difference between the first and second ciphertexts and compute an order revealing encryption value based on the generated difference between the first and second ciphertexts and the random value.

35. The system of claim 34, wherein the first computer of the SMPC cluster is further configured to generate a random value based on the secret key and the counter value, compute a difference between a pseudorandom function of a first share of the first ciphertext using the encryption key for the first ciphertext and a pseudorandom function of a first share of the second ciphertext using the encryption key for the second ciphertext and compute an order revealing encryption value based on the generated difference between the first and second ciphertexts and the random value.

36. The system of claim 35, wherein the server computer is further configured to generate a difference value between the first ciphertext and the second ciphertext, generate an exclusive OR value of the order revealing encryption value from the first computer and the order revealing encryption value from the second computer and generate a comparison value between the exclusive OR value and the difference value wherein the comparison value indicates if the first item of plain data is less than the second item of plain data.

\* \* \* \* \*